United States Patent [19]

Sorrells

[11] Patent Number: 4,945,768
[45] Date of Patent: Aug. 7, 1990

[54] PRESSURE SENSOR

[75] Inventor: David F. Sorrells, Jacksonville, Fla.

[73] Assignee: Parker Electronics, Inc., Jacksonville, Fla.

[21] Appl. No.: 196,562

[22] Filed: May 20, 1988

[51] Int. Cl.[5] .................. G01L 7/08; G01L 11/00; G01L 19/04
[52] U.S. Cl. .................. 73/703; 73/708; 73/717
[58] Field of Search .................. 73/703, 702, 708, 715, 73/717; 364/125; 367/901, 99, 125

[56] References Cited

U.S. PATENT DOCUMENTS

| | | | |
|---|---|---|---|
| 2,985,018 | 5/1961 | Williams | 73/703 |
| 3,500,301 | 3/1970 | Meier | 367/901 |
| 4,244,226 | 1/1981 | Green et al. | 73/703 |
| 4,264,788 | 4/1981 | Keidel et al. | 367/99 |
| 4,456,849 | 6/1984 | Takayama et al. | 310/324 |

Primary Examiner—Donald O. Woodiel
Attorney, Agent, or Firm—Arthur G. Yeager

[57] ABSTRACT

A pressure sensor for accurate readings of low pressures utilizes an ultrasonic transmitter which sends a signal to a movable diaphragm via a waveguide. Pressure changes across the diaphragm causes changes in the signal path length from transmitter to receiver which are translated into pressure readings via electronic circuitry employing phase comparator circuitry. The received signal is split into two signals one of which is shifted in phase. A temperature responsive controller selects which received signal is used in a comparison with the transmitted signal thus greatly extending the temperature range over which the sensor operates. The use of an ultrasonic waveguide with a length of at least twice the frequency of the transmitted signal coupled to the transmitter eliminates echoes and reflections and provides for enhanced accuracy in reading even very low pressures.

15 Claims, 2 Drawing Sheets

PRESSURE SENSOR

BACKGROUND OF THE INVENTION

1. Field of the Invention

The present invention relates to pressure sensors and devices for measuring displacement distances of pressure sensitive apparatus and particularly to those devices that utilize ultrasonic signalling.

2. Prior Art

Pressure sensors are widely known in the prior art and often employ a component that physically moves in response to pressure changes such as the movable contacts disclosed in U.S. Pat. No. 4,342,230; the movable condenser plates of capacitors disclosed in U.S. Pat. No. 2,025,719; and the movable ultrasonic reflector disclosed in U.S. Pat. No. 3,140,612. These devices suffer from the inaccuracies that result in using mechanical components such as leaf springs, helical springs or through the use of non-linear components such as variable capacitance.

Devices that specifically employ ultrasonic signal technology include U.S. Pat. No. 3,140,612 discussed above; a mercury column pressure gauge disclosed in U.S. Pat. No. 3,008,332 wherein ultrasonic sound waves propagate through columns of mercury and are reflected at a mercury-air interface for distance measurement; and apparatus utilizing expensive crystals disclosed in U.S. Pat. Nos. 2,527,208 and 4,479,070. Additional devices using ultrasonic distance measuring technology include the movable airborne ultrasonic transducers disclosed in U.S. Pat. Nos. 2,520,297 and 2,629,082.

In U.S. Pat. No. 2,985,018, a device and the associated electrical circuitry is provided for measuring the amplitude and frequency of vibrations of an ultrasonic signal-reflecting surface. A transmitter emits the sound waves that reflect off a surface vibrating at a frequency to be measured. The signal is reflected to a receiver. A reference signal path comprises a circuit which receives an oscillator signal from the oscillator that drives the transmitter. The reference signal is fed to a rotatable coil which can be manually turned during initial calibration of the device. This device operates on the principal of a phase comparison between the received signal and the reference signal. Movement of the reflecting surface will result in a phase difference between the two signals which can be interpreted as the distance of movement of the reflecting surface from some initial "zero" position established during initialization of the system. Such prior art device suffers from severe disadvantages. First, the coils used in the reference circuit are non-linear components and thus make calibration more difficult. The coils act as delay lines and they must be adjusted to provide that the reference signal travel time is compensated for the longer time it takes the transmitted signal to reach the reflecting surface and be received at the receiver. This is accomplished by rotating the reference coil to adjust the phase shift that occurs to provide no phase difference when the reflecting surface is at its "zero" position. Secondly, if the temperature changes within the measuring apparatus there is no ready approach to compensate for the different velocity of the sound waves at different temperatures and the resultant phase difference which is independent of the distance traveled by the sonic wave. Thirdly, reflections and echoes are a source of inaccuracies in enclosed chambers and the prior art does not disclose how the problem is to be solved. Finally, pressure sensors for use in systems, such as those in the heating, cooling and ventilating, require temperature compensation over a wide temperature range. None of the devices in the prior art disclose means or a method for dealing with this latter problem area.

In accord with this invention an improved pressure sensor is provided which is an inexpensive, simple device having great accuracy and an operating mechanism that maintains the accuracy over a long period of time without suffering degradation due to wear and tear. In addition, temperature compensation should be easy to achieve over a wide temperature range normally encountered in heating, cooling and ventilating systems. Also, non-linear components should be avoided for ease of calibration and circuit stability. Further, the improved device should be readily adaptable for use in measuring either static or dynamic air pressure in a duct. Finally, the pressure sensing device preferably should specifically eliminate reflections and echoes in and around the ultrasonic sound path and receiver transducers in order to ensure proper operation and enhanced high accuracy. None of the pressure sensing devices of the prior art meet all the above criteria in accord with the invention hereinafter described in greater detail.

SUMMARY OF THE INVENTION

In accord with the present invention, a pressure sensor comprises a housing, a sonic transmitter mounted inside the housing, oscillator means for driving the transmitter, a sonic receiver mounted inside the housing, a sonic reflector mounted in the housing in a signal path between said transmitter and the receiver, the reflector being movably responsive to pressure for causing changes in length of the signal path between the reflector and the receiver. Means are provided to substantially inhibit the creation of echoes and extraneous reflections of the signal within the housing, and circuit means are used to determine the relative movement of the reflector by measuring changes in the length of the signal path resulting from various pressure exerted on the reflector. The means to substantially inhibit echoes and extraneous reflections comprises a waveguide for focusing a transmitted signal onto the reflector, and has a length at least equal to twice the wavelength of a signal from the transmitter.

The housing includes an opening and the reflector is defined by a diaphragm mounted over the opening in the housing and movable therein in response to a differential pressure between the inside and outside of the housing which is air tight. The diaphragm is a nitrile membrane having a round configuration and is stretched across and substantially uniformly mounted to the housing to provide a sensitive central portion onto which a sonic signal is reflected.

In accord with another aspect of the present invention, a focusing means is coupled to the transmitter for directing a transmitted sonic signal onto the reflector, and the circuit means which is responsive to the signal from the oscillator means and the signal received by the receiver means is used to determine the phase difference between the signals which is representative of the movement of the reflector. The circuit means includes phase shift means to produce a phase-shifted signal of predetermined phase difference with respect to the signal from the receiver and a phase comparator which receives the phase-shifted signal and the signal from the oscillator means and provides an output signal representative of the movement of the reflector. The circuit means also includes a signal path for the received signal in parallel with the phase-shifted signal and has a switch means for selecting either the phase-shifted signal and the received signal as an input into the phase comparator. A controller operates the switch and includes means for monitoring the temperature of the pressure sensor. The controller operates the switch means to provide either the receiver signal or the phase-shifted signal to the phase comparator when the sensor has a temperature within a first or second range which is established by the controller. The focusing means comprises a waveguide in the shape of a parabolic horn.

The housing has an opening therethrough and the diaphragm is mounted over the opening which is circular in shape. The diaphragm is mounted on the exterior surface of the opening and has a center portion movable within the opening in response to fluid pressure. Pressure is applied against the diaphragm using a chamber having a hollow cylindrical body with a top portion, an inlet in the top portion for applying pressure to the interior of the body, and an open bottom portion having an integral laterally extending flange around the periphery thereof, and which is affixed to the housing. The means for affixing the chamber to the housing comprises a plurality of spaced threaded holes in the housing, a plurality of correspondingly spaced holes in the flange and screws for securing the chamber to the housing. Furthermore, a plurality of spaced upstanding posts are formed onto the housing and a plurality of correspondingly spaced holes in the outer portion of the diaphragm are used to place the diaphragm over the posts. A plurality of correspondingly spaced holes in the flange are used to place the flange over the posts and over and against the diaphragm for securing the diaphragm against the housing. The housing may also include a second opening therethrough for providing a second pressure inside the housing different from the pressure applied against the outside of the diaphragm.

The parabolic horn waveguide has a length sufficient to provide a strong transmitted sonic signal to the reflector and a strong reflected sonic signal to the receiver from the reflector.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE PREFERRED EMBODIMENT

Figure 1:
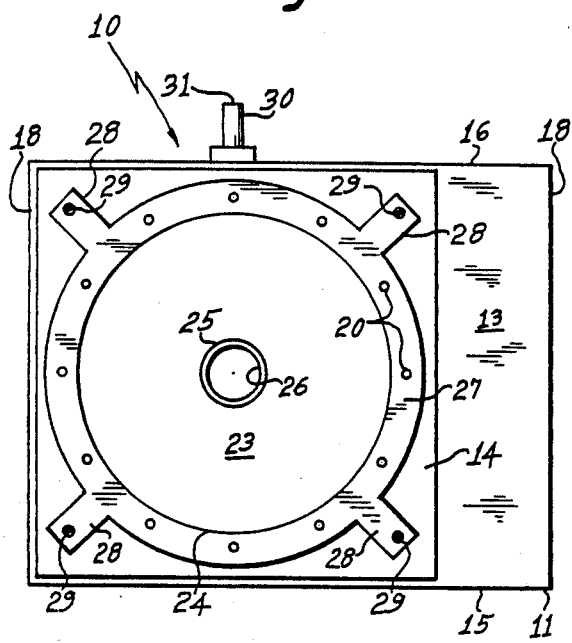
FIG. 1 is a side elevation view of the pressure sensor in accord with the present invention.
Figure 2:
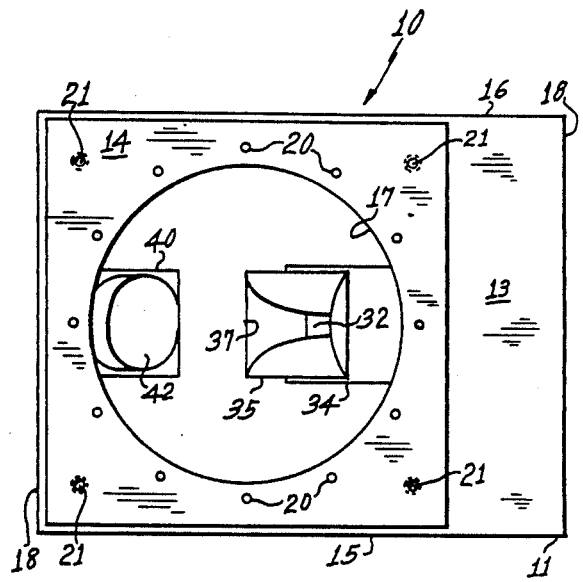
FIG. 2 is a side elevation view of the pressure sensor of FIG. 1 shown with the pressure chamber and diaphragm removed.
Figure 3:
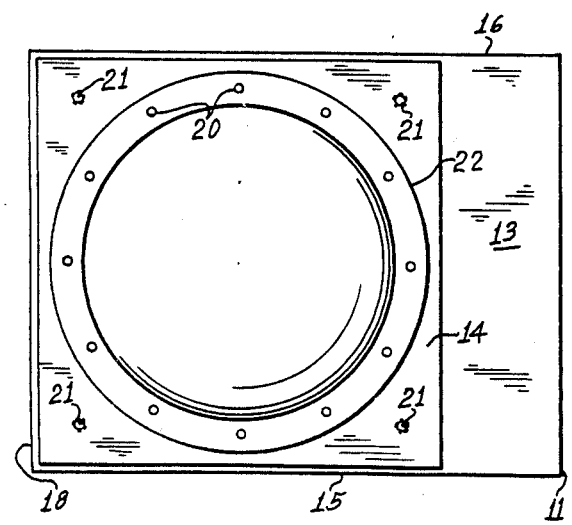
FIG. 3 illustrates the placement of the diaphragm onto the housing.
Figure 4:
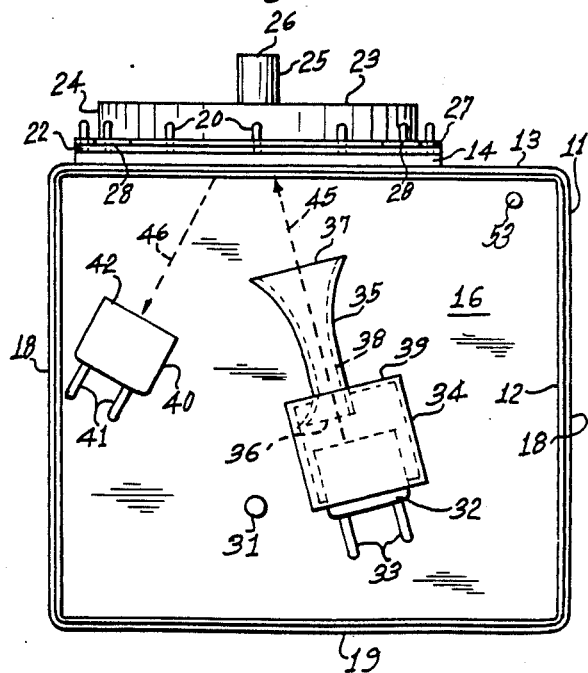
FIG. 4 is a bottom view of the sensor of FIG. 1 with the housing cover removed.

Referring now to the drawings of FIGS. 1-4, the pressure sensor in accord with the present invention is depicted by numeral 10 in FIG. 1. A molded plastic housing 11 has an interior perimeter lip 12, as seen in FIG. 4, to which is removably secured bottom cover 15 in any suitable manner. Front wall 13 has upraised circular flange or boss 14. The housing enclosure is completed by top wall 16, two side walls 18, and rear wall 19. As more clearly shown in FIG. 2, a circular opening 17 is cut out of boss 14 and is surrounded by twelve upstanding posts 20 that are molded integrally with boss 14. Boss 14 also has four spaced threaded holes 21 tapped therein.

As illustrated in FIG. 3, flexible diaphragm 22, preferably made of nitrile, is stretched and secured over uniformly spaced posts 20 via corresponding holes (not shown) that match the circular pattern of the posts 20. The diaphragm 22 is free to move inward into opening 17 in response to a differential pressure as will be described in more detail hereinbelow.

As illustrated in FIGS. 1 and 4, the diaphragm 22 is secured to boss 14 by placing high pressure inlet chamber 23 onto diaphragm 22. Chamber 23 has a circular wall 24 that matches the perimeter of opening 17 and a circular flange 27 that has spaced holes (not shown) by which the flange 27 is placed over respective posts 20. Laterally extending tabs 28 are integral with flange 27 and have holes (not shown) that fit over respective threaded holes 21. The chamber is secured to boss 14 using four screws or bolts 29. Inlet tube 25 has opening 26 for communication with air in a duct or the like and to permit the air in chamber 23 to vary and press against diaphragm 22. A low pressure inlet 30 has opening 31 for exhausting to the atmosphere, i.e., so the air pressure within housing 11 is atmospheric or at some other lower pressure.

Deflection of the diaphragm 22 is measured by ultrasonic sound emitted a 32.768 khz from ceramic ultrasonic transmitter 32 which receives power on leads 33. Transmitter 32 is mounted in housing 34 and sends a signal to acoustic waveguide 35 via entrance opening 36 and out through exit opening 37. The horn body 38 is mounted through front wall 39 of housing 34. The ultrasonic signal bounces off the nitrile diaphragm 22 and strikes the surface 42 of receiver transducer 40 which receives power output on leads 41.

Figure 5:
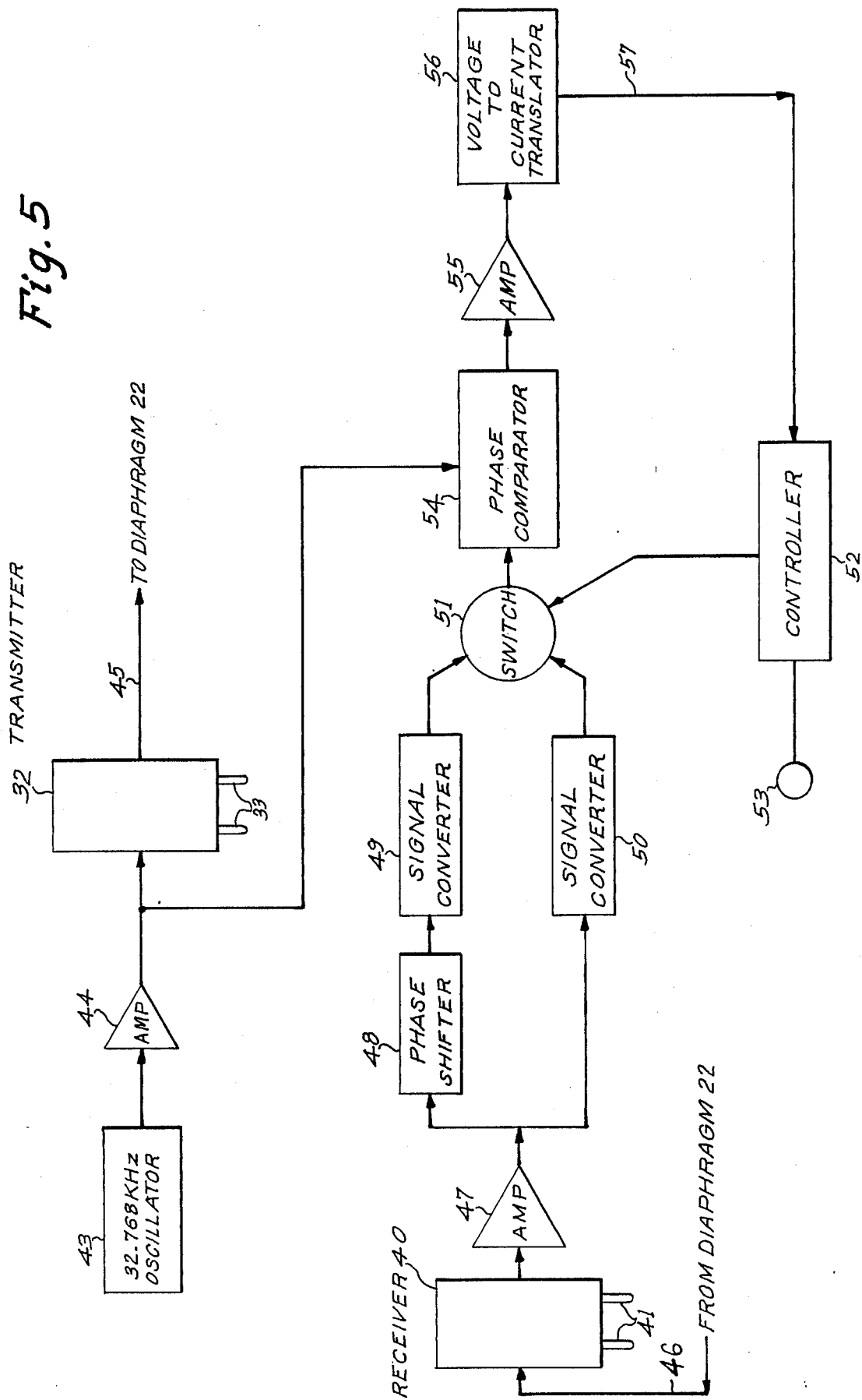
FIG. 5 is a block diagram of the electronic circuitry used with the sensor of FIG. 1.

The electronic circuitry employed in the present invention is illustrated in FIG. 5, which includes a 32.768 khz oscillator 43 supplying a square wave output signal to conventional buffer amplifier 44 which in turn drives transmitter 32. Transmitted signal 45 strikes diaphragm 22 and is reflected as signal 46 to receiver transducer 40. The received signal 46 is in the form of a sine wave and is sent to a conventional filter/amplifier 47 where the output is directed to two signal paths. The first signal path leads to the phase shifter 48 and to sine wave-to-square wave converter 49 and then to switch 51. The second signal path leads to switch 51 via sine wave-to-square wave converter 50. As will be discussed below, switch 51 is operated by controller 52 to select one of the two signals available.

Phase comparator 54 receives a square wave from switch 51 and a square wave from buffer amplifier 44 and provides an output signal based upon the phase difference to amplifier 55 and voltage-to-current translator 56. Output signal 57 can then be sent to a controller 52 or other device, such as the monitor thermostat as shown in copending U.S. patent application Ser. No. 013,869 filed Feb. 12, 1987.

A given differential pressure across the housing 11 will result in deflection of the nitrile diaphragm 22 of a particular distance that can be calculated with great accuracy. In addition, changes in temperature will cause changes in the elastic characteristics of nitrile with corresponding changes in the tension that exists on the diaphragm 22. Data regarding the amount of deflection at given differential pressures and sensor temperatures can be empirically collected or computed. This data is placed in a "Look Up" table where it can be accessed by controller 52. The phase difference detected by comparator 54 represents the difference in the total travel length of signals 45 and 46 due to the deflection of diaphragm 22 with respect to the signal sent directly to comparator 54 from amplifier 44.

As is understood in the art, the velocity of the signals 45, 46 depends on the temperature of the air in the housing 11. Temperature sensor 53, preferably is located within housing 11, and supplies data on the temperature of the air in the housing 11 and data to controller 52. In the preferred embodiment of the present invention, output signal 57 also goes to controller 52, which is a microprocessor controlled thermostat. The controller 52 can subtract the influence of temperature within the housing 11 on the derived phase difference by accessing memory which contains a "Look Up" table having data on the temperature effect on the velocity of the signals 45, 46. Due to the wide temperature ranges that are encountered in heating, cooling, and ventilating systems, the controller 52 will send a signal to switch 51 to select a different signal input for output to phase comparator 54 based upon the data from sensor 53. The two signals available to switch 51 are 90° out of phase and accordingly, the range of phase comparator 54 can be extended by switching from one signal output from switch 51 or the other. Depending upon the specific application involved, the temperature sensor may be physically located outside of housing particularly when the temperature range is smaller or less accurate determinations of air pressure are needed.

The pressure sensor according to the present invention may be used to measure either static or velocity pressure via the low pressure inlet 31. The sensor 10 is placed with front wall 13 facing into air flow in a duct as illustrated in FIG. 1 with static air pressure directed into housing 11 via inlet 31. In this configuration, output signal 57 would then represent the velocity pressure because the deflection of diaphragm 22 depends only upon the differential pressure across the housing 11. If low pressure inlet 31 is sealed closed, the sensor 10 will provide an output signal 57 that represents static pressure.

The power supply to the transducers 32 and 40 and to the electronic circuitry is 15 vdc. The power is connected to leads 33 and 41 as is understood in the art. The transmitter 32 is driven by a 0–15 vdc square wave from oscillator 43 and operates, unlike the pulsed signal of the prior art, continuously to provide enhanced reliability.

The resolution of the transducers 32 and 40 is practically infinite and, along with the signal selection at switch 51, allows for a continuous output signal 57 of great accuracy.

The acoustic waveguide 35 is formed as a parabolic horn to direct the signal 45 to a very small (0.4" radius) central area on diaphragm 22. The ultrasonic waves in signals 45 and 46 remain coherent until received at receiver transducer surface 42. The waveguide 35 prevents the scattering of signals 45, 46 which would result in spurious echoes and reflections in housing 11 and render it virtually impossible to measure deflection of the diaphragm 22 accurately. The receiver 40 receives its signal as if the ultrasonic waves were being generated from a single point source, i.e., a single point from the diaphragm 22. The length of the horn 35 is also a critical factor and preferably is at least two wave lengths long so as to deliver a signal 45 of sufficient strength for reception by transducer 42.

While the invention has been described with respect to certain specific embodiments, it will be appreciated that many modifications and changes ma be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A pressure sensor comprising a housing, a sonic transmitter mounted inside said housing, oscillator means for driving said transmitter, a sonic receiver mounted inside said housing, a sonic reflector mounted in said housing in a signal path between said transmitter and said receiver, said reflector being movably responsive to pressure for causing changes in length of said signal path between said reflector and said receiver, means to substantially inhibit the creation of echoes and extraneous reflections of said signal within said housing, and circuit means for determining the relative movement of said reflector by measuring changes in said length of said signal path resulting from various pressure exerted on said reflector, said means to substantially inhibit echoes and extraneous reflections includes a waveguide for focusing a transmitted signal onto said reflector, said waveguide having a length at least equal to twice the wavelength of a signal from said transmitter.

2. The pressure sensor as in claim 1 wherein said waveguide is a parabolic horn.

3. The pressure sensor as in claim 1 wherein said housing includes an opening, said reflector being defined by a diaphragm mounted over said opening in said housing and movable therein in response to a differential pressure between the inside and outside of said housing, said housing being air tight.

4. The pressure sensor of claim 3 wherein said diaphragm is a nitrile membrane having a round configuration and being stretched across and substantially uniformly mounted to said housing to provide a sensitive central portion onto which a sonic signal is reflected.

5. A pressure sensor comprising a sonic transmitter, oscillator means for producing a signal for driving said transmitter, a sonic receiver, a sonic reflector in a signal path between said transmitter and said receiver, said reflector being movably responsive to pressure for causing changes in length of said signal path of said signal received by said receiver, focusing means coupled to said transmitter for directing a transmitted sonic signal onto said reflector for substantially inhibiting the creation of echoes and extraneous reflections of said sonic signal within said housing by providing that said sonic signal remain coherent until it is received by said receiver, and circuit means responsive to said signal from said oscillator means and said signal received by said receiver means for determining the phase difference between said signals, said phase difference being representative of the movement of said reflector, said circuit means includes phase shift means to produce a phase-shifted signal or predetermined phase difference with respect to said signal from said receiver, and a phase comparator for receiving said phase-shifted signal and said signal from said oscillator means and providing an output signal representative of the movement of said reflector, said circuit means further includes a signal path for said received signal in parallel with said phase-shifted signal, and switch means for selecting one of said phase-shifted signal and said received signal as input into said phase comparator.

6. The pressure sensor as in claim 5 further including a controller means for selectively operating said switch, said controller means including means for monitoring the temperature of said pressure sensor, said controller means controlling said switch means to provide said receiver signal to said phase comparator when said sensor has a temperature within a first temperature range and to supply said phase-shifted signal to said phase comparator when said sensor has a temperature within a second temperature range, said first and second temperature ranges being established by said controller means.

7. The pressure sensor as in claim 5 wherein said focusing means comprises a waveguide.

8. The pressure sensor as in claim 7 wherein said waveguide is a parabolic horn.

9. A pressure sensor comprising a housing with an opening therethrough, a flexible diaphragm mounted on said housing over said opening and movable therein in response to fluid pressure, a sonic transmitter mounted in said housing for producing a sonic signal, a signal directing means coupled to said transmitter for focusing said sonic signal onto said diaphragm for substantially inhibiting the creation of echoes and extraneous reflections of said sonic signal within said housing by providing that said sonic signal remain coherent until it is received by said receiver, a sonic receiver mounted in said housing for receiving said sonic signal after reflection from said diaphragm, oscillator means for producing an electrical signal for driving said transmitter, circuit means responsive to said sonic signal received by said receiver means and said signal from said oscillator means for determining the phase difference between said signals, said phase difference being representative of the movement of said diaphragm, said opening in said housing being circular in shape, said diaphragm being mounted on the exterior surface of said opening and having a center portion movable within said opening in response to fluid pressure.

10. The pressure sensor as in claim 9 further including means to apply pressure against said diaphragm, said means including a chamber having a hollow cylindrical body with a top portion, an inlet in said top portion for applying pressure to the interior of said body, an open bottom portion, said bottom having an integral laterally extending flange around the periphery thereof, and means for affixing said flange to said housing.

11. The pressure sensor as in claim 10 wherein the means for affixing said chamber to said housing comprises a plurality of spaced threaded holes in said housing, a plurality of correspondingly spaced holes in said flange, screws for securing said chamber to said housing.

12. The pressure sensor as in claim 11 further including a plurality of spaced upstanding posts on said housing, a plurality of correspondingly spaced holes in the outer portion of said diaphragm for placing said diaphragm over said posts, a plurality of correspondingly spaced holes in said flange for placing said flange over said posts and over and against said diaphragm for securing said diaphragm against said housing.

13. The pressure sensor as in claim 9 wherein said housing includes a second opening therethrough for providing a second pressure inside said housing different from the pressure applied against the outside of said diaphragm.

14. A pressure sensor comprising a sonic transmitter, oscillator means for producing a signal for driving said transmitter, a sonic receiver, a sonic reflector in a signal path between said transmitter and said receiver, said reflector being movably responsive to pressure for causing changes in length of said signal path of said signal received by said receiver, focusing means coupled to said transmitter for directing a transmitted sonic signal onto said reflector for substantially inhibiting the creation of echoes and extraneous reflections of said sonic signal within said housing by providing that said sonic signal remain coherent until it is received by said receiver, and circuit means responsive to said signal from said oscillator means and said signal received by said receiver means for determining the phase difference between said signals, said phase difference being representative of the movement of said reflector, and means for applying a differential pressure across said reflector.

15. A pressure sensor comprising a housing, a sonic transmitter mounted inside said housing, oscillator means for driving said transmitter, a sonic receiver mounted inside said housing, a sonic reflector mounted in said housing in a signal path between said transmitter and said receiver, said reflector being movably responsive to pressure for causing changes in length of said signal path between said reflector and said receiver, means to substantially inhibit the creation of echoes and extraneous reflections of said signal within said housing, and circuit means for determining the relative movement of said reflector by measuring changes in said length of said signal path resulting from various pressure exerted on said reflector, said sonic reflector being a nitrile diaphragm.

* * * * *